United States Patent

Nahear

(10) Patent No.: US 8,183,986 B2
(45) Date of Patent: May 22, 2012

(54) TOLL TRANSPONDER WITH DEACTIVATION MEANS

(75) Inventor: Shemon Avraham Nahear, Jerusalem (IL)

(73) Assignee: Telematics Wireless Ltd, Holon (IL)

( * ) Notice: Subject to any disclaimer, the term of this patent is extended or adjusted under 35 U.S.C. 154(b) by 709 days.

(21) Appl. No.: 11/089,449

(22) Filed: Mar. 24, 2005

(65) Prior Publication Data

US 2006/0125603 A1    Jun. 15, 2006

(30) Foreign Application Priority Data

Dec. 9, 2004    (IL) .......................................... 165700

(51) Int. Cl.
*H04Q 5/22* (2006.01)
(52) U.S. Cl. ...................................... 340/10.5; 340/928
(58) Field of Classification Search .................. 340/928
See application file for complete search history.

(56) References Cited

U.S. PATENT DOCUMENTS

| | | | | |
|---|---|---|---|---|
| 2,264,746 A | * | 12/1941 | Ellwood ........................ | 335/154 |
| 5,310,999 A | * | 5/1994 | Claus et al. .................... | 235/384 |
| 5,621,412 A | * | 4/1997 | Sharpe et al. ............... | 340/10.33 |
| 5,748,106 A | * | 5/1998 | Schoenian et al. ............ | 340/928 |
| 6,816,707 B1 | * | 11/2004 | Barker et al. ................ | 455/41.2 |
| 2002/0067273 A1 | * | 6/2002 | Jaques et al. ............... | 340/573.4 |
| 2002/0175807 A1 | * | 11/2002 | Ashwin ....................... | 340/10.51 |
| 2005/0139668 A1 | * | 6/2005 | Trippe et al. .................. | 235/440 |
| 2006/0001525 A1 | * | 1/2006 | Nitzan et al. ................. | 340/10.1 |

OTHER PUBLICATIONS

Request for Proposal (RFP), Interstate 394—High-Occupancy toll (HOT) Lanes Project, Transponder Procurement, Cofiroute USA, LLC, pp. 1-43, Nov. 16, 2004.

* cited by examiner

*Primary Examiner* — Brian A Zimmerman
*Assistant Examiner* — Omer S Khan
(74) *Attorney, Agent, or Firm* — Ladas & Parry LLP

(57) ABSTRACT

A transponder of an interrogator and toll highway system has a non-electronically activated switch for a first state in which the transponder is in an "active" mode and a second state in which the transponder to be in an "inactive" mode. A non-electronic hanging device hangs the transponder in a vehicle for receiving interrogating signals and a non-electronic activator causes the switch to be in the first state only when the transponder is placed within the hanging device, and to be in an "inactive" mode when the transponder is not placed within the hanging device.

3 Claims, 3 Drawing Sheets

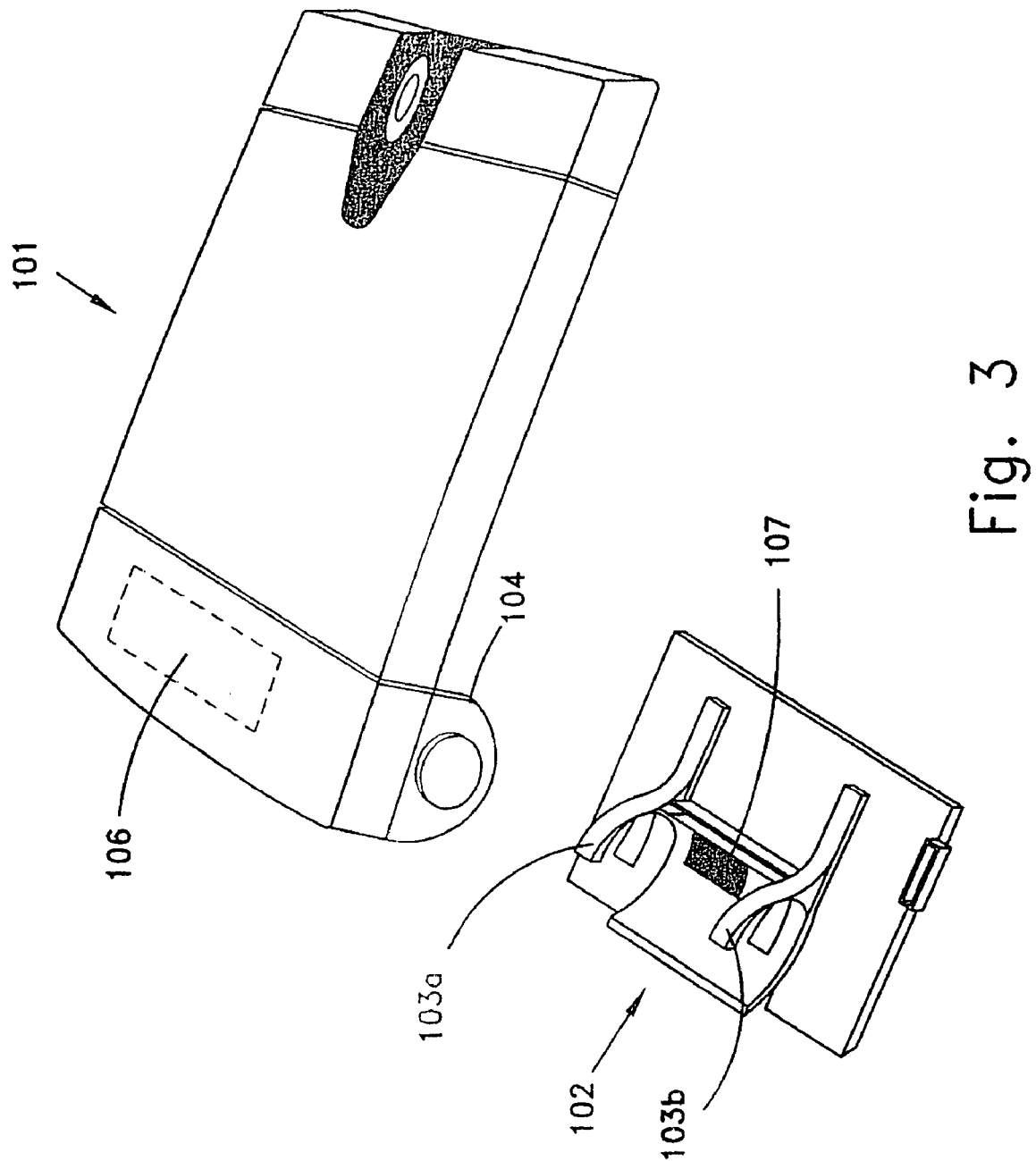

TOLL TRANSPONDER WITH DEACTIVATION MEANS

FIELD OF THE INVENTION

The present invention relates in general to means for enabling electronic payment on toll highways. More particularly, the present invention relates to means by which the driver can easily switch his toll transponder installed in his car between an "active" and "non-active" mode.

BACKGROUND OF THE INVENTION

It has become common to electronically monitor and charge vehicles entering or moving on toll highways by means of an interrogator and transponder. The interrogator is a transmitter/receiver device owned by the highway operator that communicates with transponders that are installed within the vehicles. One or more of such interrogators are installed at the entrance or at specific locations along sections of the highway. Only upon receipt of the interrogation signal, the vehicle transponder responds by transmitting the identity of the car (or any other unique signal enabling the identification of the car) to the interrogator. Upon receipt and processing of the transponder signal, the highway operator can charge the car owner for using the highway.

The interrogators and transponders usually operate by means of electromagnetic signals, but the present invention is not limited to any type of communication means, for example, optical, ultrasonic, etc. Most commonly, the interrogators and transponders operate by means of RF signals, and therefore the transponder is sometimes referred to as "RF ID". Furthermore, there have been developed specific protocol standards for such interrogator-transponders communication, for example ASTM V6.

Generally, the vehicle transponder is in a form of an electronic card or in a form of a small circuit which is mounted within a closed, sometimes molded casing. The transponder is generally positioned by the driver at the internal side of the front vehicle window.

Generally, the transponders operate in an "always active" mode, i.e., there is no switch for turning them OFF. In order to save energy of the transponder battery, the transponder is designed to stay in "standby" mode during most of the time, and they switch to "transmit" mode only upon receipt of an interrogation signal. During the "standby" mode, the energy consumption is minimal. When the battery becomes weak or empty, the driver either replaces the battery or the whole transponder unit with the battery.

In some locations in the US regulations have been effected which allow drivers who carry passengers above a specific number to use dedicated lanes (HOV—High Occupancy Vehicle). Recently, in some locations in the US regulations have been effected which allow drivers who carry passengers under specific number to use said same dedicated lanes by paying toll. Such a manner of using the toll lanes requires the driver to switch his transponder between an "active" mode (when the number of passengers in the vehicle is below the limit, and he has to pay for using the lane) and a "non-active" mode (when the number of passengers is above that limit, and he does not to pay for using the lane.

As said, the conventional transponders operate in an "always active" mode, and they are not provided with a switch for its deactivation. One possible way which has been proposed for enabling a driver to deactivate the transponder is to use masking bag. More particularly, it has been proposed to provide each driver with a masking bag made of metal. When the driver wishes to deactivate the transponder, he is required to detach the transponder from its location on the window, and to put it in the masking bag. The masking bag masks and prevents electromagnetic signals from the interrogator to reach the transponder, or signals leaving the transponder to reach the interrogator. However, such an approach is not safe, as it requires the driver to perform actions that divert his attention from the highway.

Another approach that has been proposed is to provide within the transponder a simple ON-OFF switch accessible to the driver, that will be turned ON or OFF by the driver according to necessities. Although this option is possible, it also not safe, as it requires a significant attention by the driver. The status of the switch, which has to be relatively small, cannot be easily observed by the driver. Also, the location of the transponder may make it hard for the driver to determine the status of the switch. These size and location limitations, in addition to the safety issue, can make confusion to the driver, such that he might pay when he does not have to, or might violate the toll regulations by not payment.

As shown, both of the above two proposed arrangements are not convenient for the driver, and are not safe.

It is therefore an object of the present invention to provide an arrangement that will enable the driver to easily switch the status of the transponder between the "active" and "non active" modes, and to enable him to easily and accurately determine in what mode the transponder is.

It is a further object of the invention to enable said switching and status determination in a most convenience, and safety manner.

Other objects and advantages of the present invention will become apparent as the description proceeds.

SUMMARY OF THE INVENTION

The present invention relates to a transponder system for use in conjunction with an interrogator of a toll highway, which comprises: (a) a transponder having two modes: (a.1) an "active" mode during which the transponder is mostly in standby, while it sends an identification signal upon receipt of an interrogator signal; and (a.2) an "inactive" mode during which the transponder is inactive; (b) a switch within the transponder having two states, a first state in which it causes the transponder to be in said "active" mode, and a second state in which it causes the transponder to be in said "inactive" mode; (c) a hanging device for enabling placement of the transponder in it, said hanging device being attached to a part of the vehicle where the transponder, when placed, is capable of receiving interrogating signals coming from a proximate interrogator; and (d) an activator at said hanging device for causing said switch to be in said first state only when the transponder is placed within the hanging device, and to be in an "inactive" state when the transponder is not placed within the hanging device.

Preferably, the transponder is an electronic card located within a closed casing.

Preferably, the switch is a magnetic switch or a reed switch located within the transponder, and wherein the activator is a magnet or made from a ferromagnetic material.

Alternatively, the switch is an optical switch located within the transponder, and wherein the activator is an element made from an opaque material which is placed at the hanging device at a location in which it interrupts the light passage at the switch when the interrogator is placed within the hanging device.

BRIEF DESCRIPTION OF THE DRAWINGS

In the Drawings:

FIG. 3 shows a transponder for use in toll highways, with its hanging device, according to the present invention.

DETAILED DESCRIPTION OF PREFERRED EMBODIMENTS

As said, an object of the present invention is to provide an arrangement that will enable the driver to easily switch the status of the transponder between "active" and "non active" modes, and to enable him to easily and accurately determine in what mode the transponder is. Another object is to enable said switching and status determination in a most convenient and safe manner.

Figure 1:
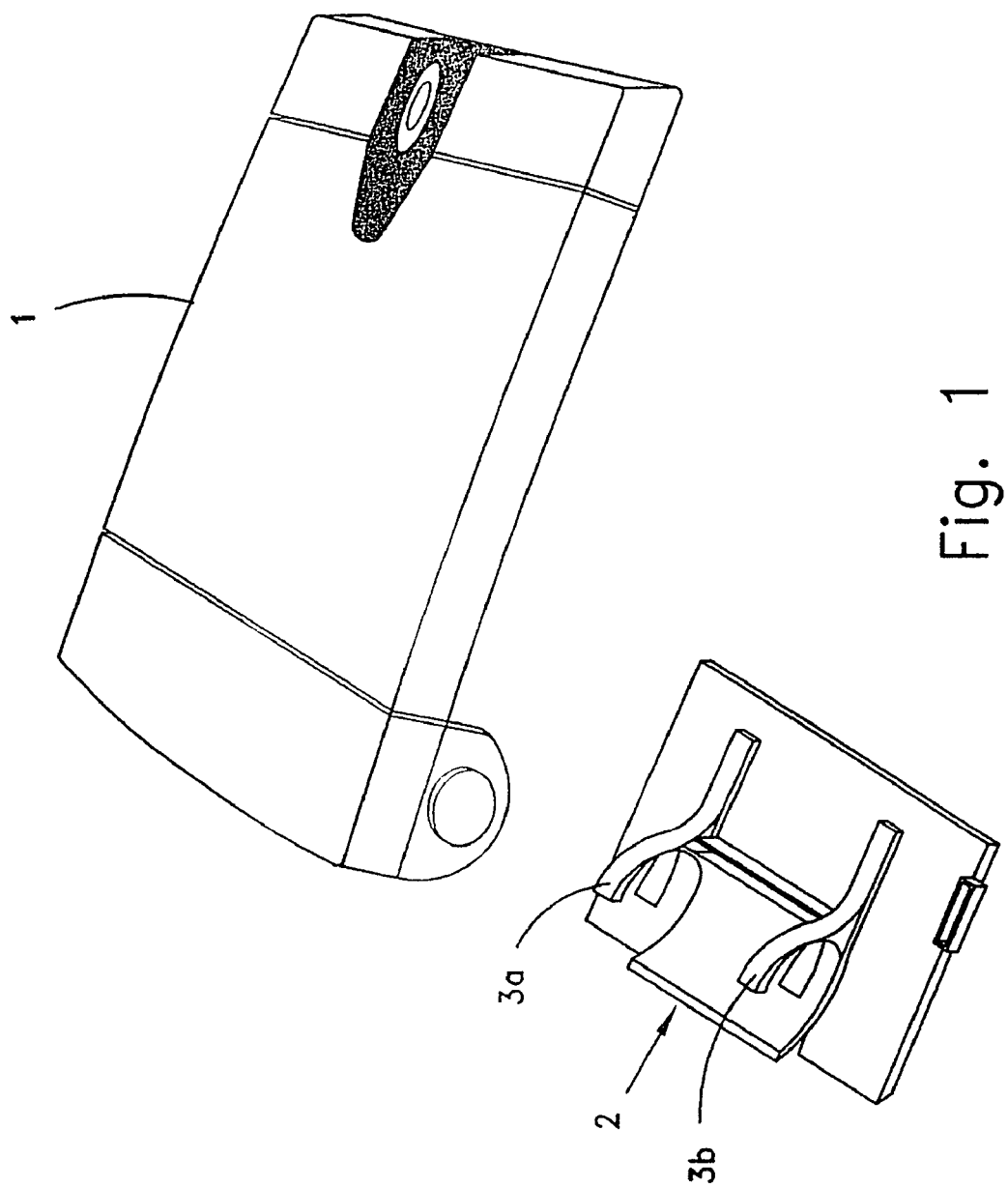
FIG. 1 shows a transponder for use in toll highways, with its hanging device, according to the prior art.

FIG. 1 shows a typical transponder 1 with its hanging device 2. The transponder is generally attached to the internal surface of the front vehicle window, or to a location close to the window by means of some attachment device. For example, the device may be attached to the window by means of a hanging device 2. The hanging device 2 generally has a sticker (not shown) at its rear surface, and hangers 3a and 3b at the front. The hanging device is generally attached to the front window at a location which at most minimally obstructs the view of the driver, for example, behind the front mirror. The transponder has at its back a corresponding cylindrical arrangement 4 (not shown) for engagement with said hangers 3a and 3b.

Figure 2:
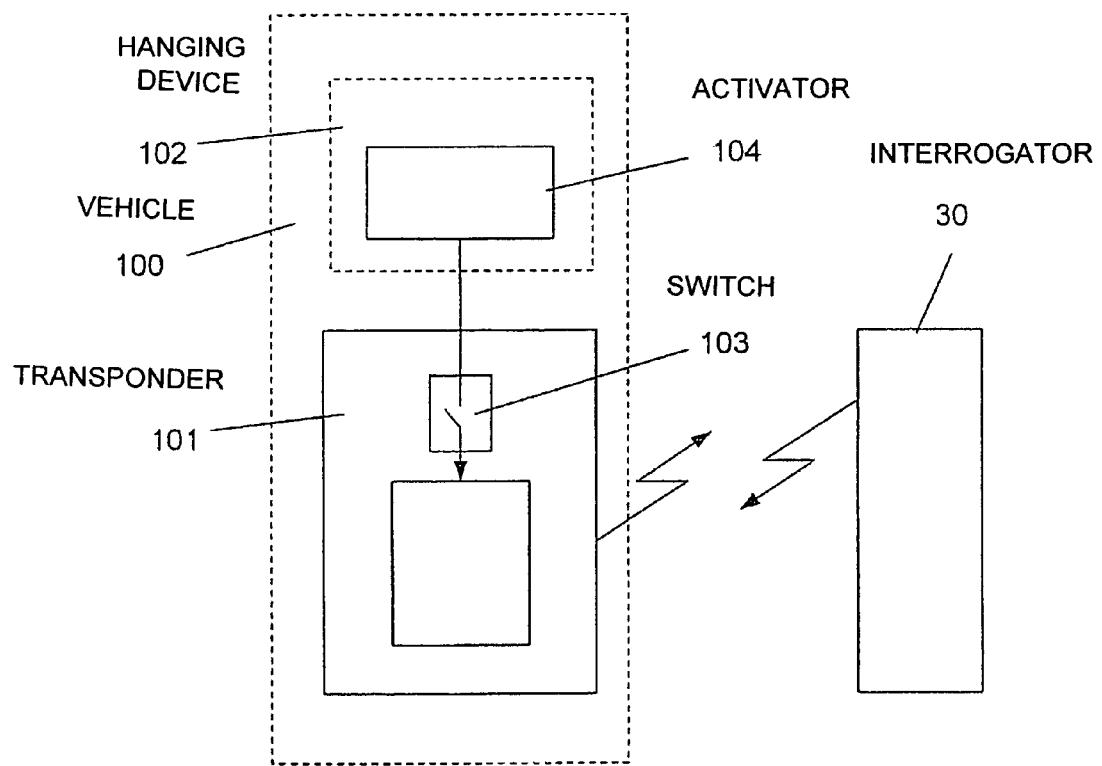
FIG. 2 is a block diagram generally illustrating the system of the present invention.

FIG. 2 is a block diagram illustrating a toll system according to the present invention. The interrogator 30 communicates with a transponder 101 located within the vehicle 100, and which is attached to a portion of the vehicle, for example to its front window by means of a device 102 which will be referred herein as a "hanging device". According to the present invention the transponder 101 comprises a switch 103. The switch 103 is designed to activate or deactivate the transponder. The state of the switch itself is controlled by means of a switch activator 104 located at the hanging device 102. The switch activator operates in such a manner that when the transponder engages with the hanging device 102, the activator 104 causes switch 103 of the transponder to activate the transponder, and when the transponder 101 is detached from the hanging device, the switch 103 deactivates the transponder. More particularly, the act of the engagement of the transponder to the hanging device causes the activation of the transponder 101, As long as the transponder remains attached to the hanging device, it is active. However, when the transponder is detached from the hanging device it is deactivated. In other words, the act of the detachment of the transponder from the hanging device causes the deactivation of the transponder 101.

According to the present invention the switch 103 which is generally positioned within the transponder and the activator 104 are adapted to operate together. For example, the switch may be a magnetic switch, and in that case the activator is a magnet or it is made from a ferromagnetic device. In that case the switch 103 is turned ON by sensing the proximity of the activator. In another embodiment, the switch 103 is a reed switch, and the activator is a magnet or it is made from a ferromagnetic device. A reed switch is an element known in the art which is capable of sensing proximity of a magnet or a ferromagnetic material. In a third embodiment, switch 103 is an optical switch which comprises a light emitting and light-sensitive elements directed one to the other. As long as the light passage between the two is maintained, switch 103 is OFF. When the light passage between the two is blocked, the switch turns ON. According to the said third embodiment, the activator 104 is a small opaque element that when the transponder is attached to the hanging device enters to within the light passage and blocks it, therefore turning the switch ON (and activating the transponder).

FIG. 3 shows a transponder 1 and a hanging device 102 according to an embodiment of the present invention. As before, the transponder is attached to the internal surface of the front vehicle window, or to a location close to the window by means of the hanging device 102. The hanging device 102 has a sticker (not shown) at its rear surface, and hangers 103a and 103b at the front. The hanging device 102 is generally attached to the front window at a location which at most minimally obstructs the view of the driver, for example, behind the front mirror. The transponder 101 has at its back a corresponding cylindrical arrangement 4 for engagement with said hangers 103a and 103b. The transponder further comprises within its casing a magnetic switch or a reed switch 106 for activating or deactivating the transponder, and the hanger further comprises a small magnet 107. When the transponder is positioned to within the hanging device, switch 106 senses the proximity of the magnet 107, and turns ON, therefore activating the transponder. When the transponder 101 is removed from its place within the hanging device 102, the switch 106 no longer senses the proximity of magnet 107, and therefore it turns OFF (i.e., it deactivates the transponder).

As shown, the activation of the device is performed by merely putting the transponder in its place within the hanging device 102. The deactivation of the transponder takes place by merely removing the transponder from its place within the hanging device 102. Therefore, when the driver wishes transponder to operate normally, he merely has to ensure that it is in its place within the hanging device. When he wishes to deactivate the transponder, for example when he carries a number of passengers above the limit, he has just to remove the device from its place, or to ensure that it is not in its place within the hanging device.

In the case when an optical switch is used within transponder 101, the hanging device has to be designed to include a blocking, opaque element that will interrupt the passage of light when the transponder is put in its place within the hanging device 102.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A transponder system for use in conjunction with an interrogator of a toll highway comprising:
   a. a transponder which comprises a transponder electronic circuitry which enables interaction with an optical switch, said circuitry being encased within an essentially closed casing, said transponder having two modes:
      I. an "active-responsive" mode during which the transponder is continuously in standby, while upon receipt of an interrogator signal it responds by sending an identification signal; and II. an "inactive-not responsive" mode during which the transponder does not respond to any interrogation signal;
b. a non-electronically activated switch within the transponder casing having two states, a first state in which it causes the transponder to be in said "active-responsive" mode, and a second state in which it causes the transponder to be in said "inactive-not responsive" mode;
c. a non-electronic hanging device for placement of the transponder therein, said hanging device being attached to a part of the vehicle where the transponder, when placed, is capable of receiving interrogating signals coming from a proximate interrogator; and
d. a non-electronic activator at said hanging device for causing said non-electronically activated switch to transfer into said first state upon placement of the transponder within said non-electronic hanging device, thereby causing the transponder to be in said "active-responsive" mode, and for causing said non-electronically activated switch to transfer into said second state upon removal of the transponder from said non-electronic hanging device, thereby causing the transponder to transfer into said "inactive-not responsive" mode, therefore, the mere existence of said transponder casing within said hanging device provides to a vehicle driver a clear indication that the transponder is in the "active-responsive" mode, while absence of the transponder casing from said hanging device is a clear indication to the vehicle driver that the transponder is in said "inactive-non-responsive" mode, wherein the non-electronically activated switch is said optical switch located within the transponder, and wherein the non-electronic activator is an element made from an opaque material which is placed at the non-electronic hanging device at a location in which it interrupts the light path at the switch when the interrogator is placed within the non-electronic hanging device, and wherein if said casing is not fully closed, there exists an opening in said casing which at most allows said activator on said non-electronic hanging device to enter the interior of the casing in order to block a said light passage at said non-electronically activated switch.

2. A system according to claim 1 wherein the transponder is an electronic card located within a closed casing.

3. In a transponder of an interrogator and toll highway system, wherein the transponder is of a type that enables interaction with an optical switch, and said transponder has an "active-responsive" mode during which the transponder is continuously in standby, while upon receipt of an interrogator signal it responds by sending an identification signal, and an "inactive-not responsive" mode during which the transponder does not respond to any interrogation signal, the improvements comprising:

a non-electronically activated switch within an essentially closed transponder casing of the transponder having a first state in which it causes the transponder to be in the "active-responsive" mode, and a second state in which it causes the transponder to be in the "inactive-not responsive" mode;

a non-electronic hanging device for receiving the transponder and attaching to a part of a vehicle where the transponder is capable of receiving the interrogator signal coming from a proximate interrogator; and a non-electronic activator on at least one of the transponder and hanging device for causing the non-electronically activated switch to be in the first state only when the transponder is received by the hanging device, therefore, the mere existence of said transponder casing within said hanging device provides to a vehicle driver a clear indication that the transponder is in the "active-responsive" mode, while absence of the transponder casing from said hanging device is a clear indication to the vehicle driver that the transponder is in said "inactive-non-responsive" mode wherein said non-electronically activated switch is said optical switch located within the transponder, and wherein the non-electronic activator is an element made from an opaque material which is placed at the non-electronic hanging device at a location in which it interrupts a light path at the switch when the interrogator is placed within the non-electronic hanging device, and wherein if said casing is not fully closed, there exists an opening in said casing which at most allows said activator on said non-electronic hanging device to enter the interior of the casing in order to block a said light path at said non-electronically activated switch.

* * * * *